United States Patent
Tsurube et al.

(10) Patent No.: US 8,982,258 B2
(45) Date of Patent: Mar. 17, 2015

(54) IMAGING DEVICE, IMAGING METHOD AND PROGRAM

(71) Applicant: Panasonic Corporation, Osaka (JP)

(72) Inventors: Tomoyuki Tsurube, Tokyo (JP); Keiji Toyoda, Kanagawa (JP); Nobuyuki Hirose, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 5 days.

(21) Appl. No.: 13/923,805

(22) Filed: Jun. 21, 2013

(65) Prior Publication Data

US 2013/0278803 A1 Oct. 24, 2013

Related U.S. Application Data

(63) Continuation of application No. PCT/JP2011/003550, filed on Jun. 22, 2011.

(30) Foreign Application Priority Data

Feb. 21, 2011 (JP) .................................. 2011-034491

(51) Int. Cl.
*H04N 5/335* (2011.01)
*H04N 5/357* (2011.01)
*H04N 5/361* (2011.01)

(52) U.S. Cl.
CPC ............... *H04N 5/357* (2013.01); *H04N 5/361* (2013.01)
USPC .......................................... 348/294; 348/241

(58) Field of Classification Search
CPC ...................................................... H04N 5/335
USPC ............................................................ 250/208.1
See application file for complete search history.

(56) References Cited

U.S. PATENT DOCUMENTS 5,293,225 A * 3/1994 Nishiyama et al. ........... 348/242
2005/0253939 A1 11/2005 Nakashima et al.

(Continued)

FOREIGN PATENT DOCUMENTS

JP 07-067038 A 3/1995
JP 2001-218081 A 8/2001

(Continued)

OTHER PUBLICATIONS

European Search Report for Application No. 11859050.4-1905 dated Oct. 10, 2013.
International Search Report for PCT/JP2011/003550 dated Jul. 19, 2011.

*Primary Examiner* — Tuan Ho
(74) *Attorney, Agent, or Firm* — Pearne & Gordon LLP

(57) ABSTRACT

Of the output signals of a solid state image sensor 101, only the signals in a vertical OB line period are selected by an OB line selector 105. A level adjuster 107 adjusts the level of a past vertical OB line signal read out from the line memory 106 during a first vertical OB line period of a frame where the amplification factor of an amplifier 102 has changed, and outputs the same. A subtractor 109 subtracts the signal whose level has been adjusted from a current vertical OB line signal. A multiplier 111 multiplies, via a selector B 111, the signal after subtraction by a cyclic coefficient $K_{1H}$ for the first vertical OB line period of the frame where the amplification factor has changed. A subtractor 112 subtracts the multiplication result from the current vertical OB line signal, and rewrites the subtraction result to the line memory 106.

2 Claims, 4 Drawing Sheets

(56) References Cited

U.S. PATENT DOCUMENTS

| | | |
|---|---|---|
| 2006/0092283 A1 | 5/2006 | Tanizoe et al. |
| 2008/0170138 A1* | 7/2008 | Shibasaki .................... 348/241 |
| 2010/0085451 A1 | 4/2010 | Suwa |

FOREIGN PATENT DOCUMENTS

| | | |
|---|---|---|
| JP | 2005-354670 A | 12/2005 |
| JP | 2006-94474 A | 4/2006 |

* cited by examiner

IMAGING DEVICE, IMAGING METHOD AND PROGRAM

TECHNICAL FIELD

The present invention relates to an imaging device that uses a solid state image sensor, an imaging method and a program.

BACKGROUND ART

Conventionally, an imaging device that uses a solid state image sensor has a problem concerning image quality deterioration due to cyclic clock noise due to system or noise due to a defect in a vertical transfer register. Although the level itself of the noise is extremely low, the noise shows on a screen as fixed vertical line noise and is highly visible, resulting in significant deterioration in the image quality. Furthermore, a smear phenomenon of linear blown-out highlights occurring on the overall image at the time of imaging an object with much higher brightness than its surroundings is also one of the main causes of image quality deterioration.

A method of removing such vertical line noise is being studied, and Patent Literature 1 (Japanese Patent Laid-Open No. 7-67038) discloses a method of reducing white lines or the like and the smear by integrating (averaging) output signals of an optical black pixel part in the vertical direction (vertical OB region) of a solid sate image sensor on a per pixel basis and averaging random noise components to zero to thereby detect a fixed pattern noise signal, and subtracting the fixed pattern noise signal from output signals of an effective pixel part of the solid sate image sensor.

FIG. 4 is a block diagram showing an overview of an example configuration of a conventional imaging device at the time of performing correction of vertical line noise (hereinafter, referred to simply as "vertical line") using a vertical OB region as described above which is an optically black region.

As shown in FIG. 4, an output signal from a solid state image sensor 1001 is amplified by an amplifier 1002, quantized by an AD converter 1003, and then input to a vertical line correction unit 1004.

The vertical line correction unit 1004 includes an OB line selector 1005, a line memory 1006, a line integrator 1007, and a subtractor 1008.

Of the signals of an effective pixel region and the signals of a vertical OB region, the OB line selector 1005 outputs only the signals of the vertical OB region. The line integrator 1007 line-integrates (averages) the signals of the vertical OB region on a per pixel basis using the line memory 1006. Random noise is thereby removed, and a correction value for one line is obtained. This correction value is stored in the line memory 1006. The line integrator 1007 reads out the correction value stored in the line memory 1006, and outputs the same to the subtractor 1008. The subtractor 1008 subtracts the correction value described above from each line signal input from the solid state image sensor 1001 on a per pixel basis. A signal from which the vertical line noise is removed (which has been corrected in terms of vertical lines) is obtained in this manner.

CITATION LIST

Patent Literature

Patent Literature 1: Japanese Patent Laid-Open No. 7-67038

SUMMARY OF INVENTION

Technical Problem

However, with a conventional method as described above, if the number of lines in the vertical OB region provided in the solid state image sensor is small, the number of times of averaging per one pixel in the vertical direction at the time of performing line integration (averaging) in a frame is reduced, and the noise is sometimes not sufficiently reduced, and the noise may remain in the signal after correction. Also, in the case of performing averaging between frames, the noise and vertical lines may remain especially if the gain of the amplifier 1002 of the imaging device is changed between the frames.

The present invention is made in view of the issues of a conventional imaging device as described above, and its object is to provide a technique for obtaining high image quality by appropriately performing vertical line correction even if the number of lines in a vertical OB region is small or the gain of an amplifier is changed between frames.

Solution to Problem

To solve the issue described above, an imaging device of the present invention includes a solid state image sensor including an optical black region, and a vertical line correction unit for performing vertical line correction on an output signal of the solid state image sensor, wherein the vertical line correction unit includes an OB line selector for selecting an optical black line signal included in output signals of the solid state image sensor, a memory for storing the optical black line signal, a level adjuster for adjusting a level of an optical black line signal of a past frame read out from the memory, according to a video gain of the output signal of the solid state image sensor, a first subtractor for calculating a difference signal between a first optical black line signal of a current frame and the optical black line signal of the past frame whose level has been adjusted, a multiplier for calculating a product by multiplying the difference signal by a cyclic coefficient, a second subtractor for obtaining a signal which is the optical black line signal of the current frame from which the product of the difference signal and the cyclic coefficient has been subtracted, and rewriting the signal after subtraction to the memory as an optical black line signal, and a third subtractor for subtracting a signal read out from the memory from an output signal from an effective pixel region of the solid state image sensor.

Also, an imaging method of the present method is an imaging method of performing vertical line correction on an output signal of a solid state image sensor including an optical black region, the method including a step of selecting an optical black line signal included in output signals of the solid state image sensor, a step of storing the optical black line signal in a memory, a step of reading an optical black line signal of a past frame from the memory and adjusting a level according to a video gain of the output signal of the solid state image sensor, a first subtracting step of calculating a difference signal between a first optical black line signal of a current frame and the optical black line signal of the past frame whose level has been adjusted, a step of calculating a product by multiplying the difference signal by a cyclic coefficient, a second subtracting step of obtaining a signal which is the optical black line signal of the current frame from which the product of the difference signal and the cyclic coefficient has been subtracted, and rewriting the signal after subtraction to the memory as an optical black line signal, and a third subtracting step of subtracting a signal read out from the memory from an output signal from an effective pixel region of the solid state image sensor.

Furthermore, a program of the present invention is a program for performing vertical line correction on an output signal of a solid state image sensor including an optical black region, the program being for causing a computer to execute the following steps: a step of selecting an optical black line signal included in output signals of the solid state image sensor, a step of storing the optical black line signal in a memory, a step of reading an optical black line signal of a past frame from the memory and adjusting a level according to a video gain of the output signal of the solid state image sensor, a first subtracting step of calculating a difference signal between a first optical black line signal of a current frame and the optical black line signal of the past frame whose level has been adjusted, a step of calculating a product by multiplying the difference signal by a cyclic coefficient, a second subtracting step of obtaining a signal which is the optical black line signal of the current frame from which the product of the difference signal and the cyclic coefficient has been subtracted, and rewriting the signal after subtraction to the memory as an optical black line signal, and a third subtracting step of subtracting a signal read out from the memory from an output signal from an effective pixel region of the solid state image sensor.

Advantageous Effects of Invention

According to the present invention, even when the number of lines in a vertical OB region is small, noise is effectively reduced by a cyclic operation between frames, and appropriate vertical line correction may be performed. Also, even when the gain of an amplifier of the imaging device is changed between frames, the level of a vertical OB line signal cycled to the previous frame may be adjusted to the extent of a change in a video level and be cycled. As a result, vertical line correction may be performed while reducing the correction residue by causing the level of a vertical line correction signal to follow the video level change such as a change in an amplification factor.

DESCRIPTION OF EMBODIMENT

Hereinafter, an embodiment for carrying out the present invention will be described with reference to the drawings.

Embodiment

Figure 1:
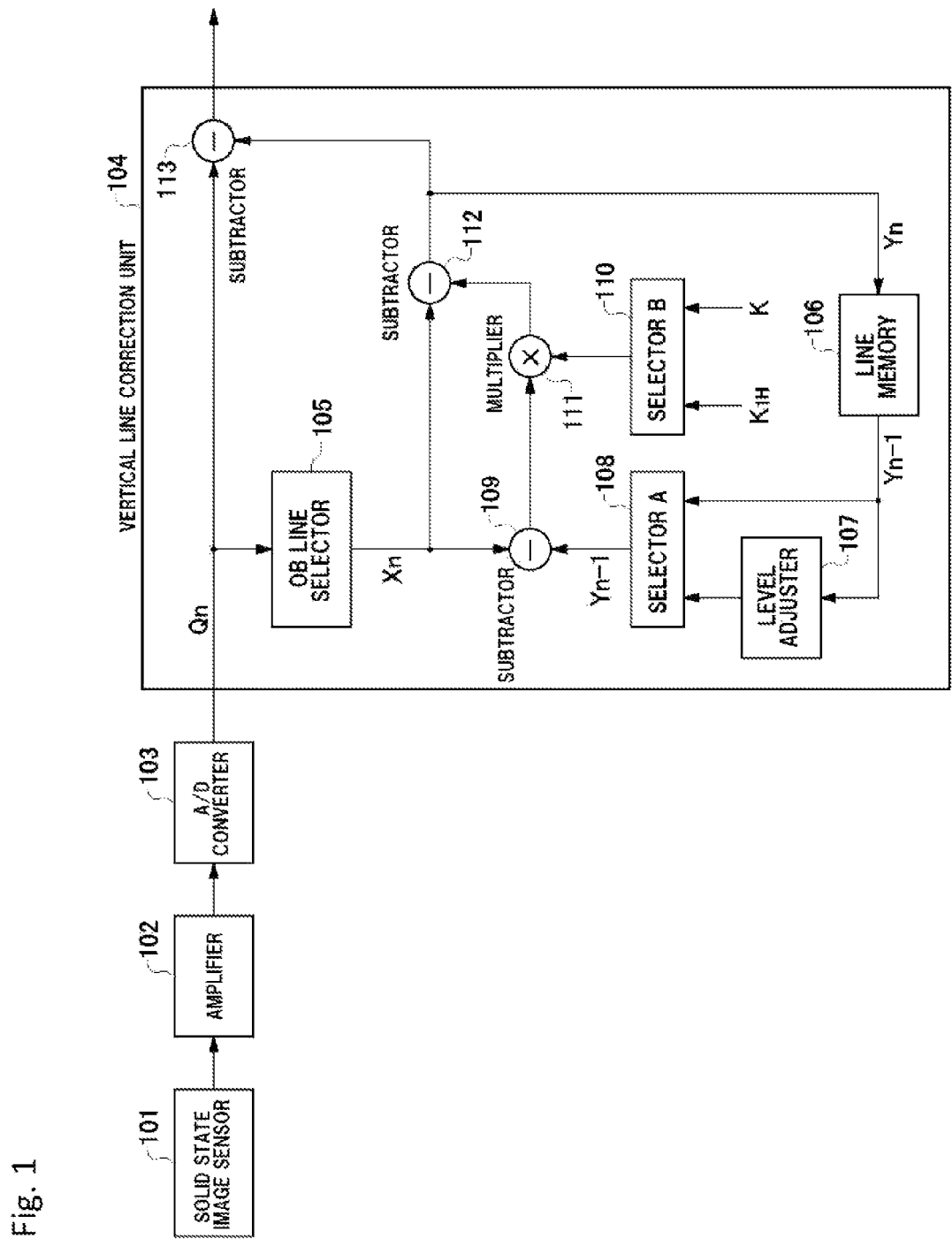
FIG. 1 is a block diagram showing a configuration of an imaging device according to an embodiment.

FIG. 1 is a block diagram showing a configuration of an imaging device according to a present embodiment.

An output signal of a solid state image sensor 101 is amplified by an amplifier 102, quantized by an AD converter 103, and then input to a vertical line correction unit 104.

The vertical line correction unit 104 includes an OB line selector 105, a tine memory 106, a level adjuster 107, a first selector (a selector A) 108, a second selector (a selector B) 110, a multiplier 111, and three subtractors 109, 112 and 113.

Signals $Q_n$, quantized by the AD converter 103 are input to the OB line selector 105, and of the signals $Q_n$, only the signals in a vertical OB line period (vertical OB line signals: $X_n$) are output.

A subtraction result $Y_n$ obtained by performing an operation described later on the vertical OB line signal $X_n$ is rewritten to the line memory 106 for each frame.

With respect to the subtraction result stored in the line memory 106, in the case the vertical OB line signal X, is the first vertical OB line signal in a frame, the vertical OB line signal $Y_{n-1}$ of a past frame is emitted to the level adjuster 107. This vertical OB line signal $Y_{n-1}$ of a past frame is a vertical OB line signal of a past frame read out from the line memory 106 during a period of input of the first vertical OB line signal in a frame to the vertical line correction unit 104.

On the other hand, in the case the vertical OB line signal $X_n$ is a vertical OB line signal of a second or later line, the vertical OB line signal $Y_{n-1}$ of a past frame is emitted to the selector A 108 without going through the level adjuster 107.

When the vertical OB line signal $Y_{n-1}$ of a past frame is emitted to the level adjuster 107 in the case the vertical OB line signal $X_n$ is the first vertical OB line signal in a frame, the level adjuster 107 adjusts the level of the vertical OB line signal $Y_{n-1}$, according to the amplification factor of the amplifier 102, and outputs the vertical OB line signal $Y_{n-1}$ which has been adjusted to the selector A 108. Additionally, level adjustment according to the amplification factor of the amplifier 102 will be described later.

In the case the vertical OB line signal $X_n$ is the first vertical OB line signal in a frame, the selector A 108 emits the vertical OB line signal $Y_{n-1}$ after level adjustment to the subtractor 109, and in the case the vertical OB line signal $X_n$ is the vertical OB line signal of a second or later line, the selector A 108 emits the vertical OB line signal $Y_{n-1}$ of a past frame to the subtractor 109.

The subtractor 109 receives input of the vertical OB line signal $X_n$ from the OB line selector 105 and the vertical OB line signal $Y_{n-1}$ from the selector A 108, subtracts the vertical OB line signal $Y_{n-1}$ from the vertical OB line signal $X_n$, and outputs the result $(X_n-Y_{n-1})$ to the multiplier 111.

In the case the vertical OB line signal $X_n$ is the first vertical OB line signal in a frame, the selector B 110 outputs a cyclic coefficient $K_{1H}$ to the multiplier 111, and in the case the vertical OB line signal $X_n$ is the vertical OB line signal of a second or later line, the selector B 110 outputs a cyclic coefficient K to the multiplier 111.

The multiplier 111 receives input of the subtraction result $(X_n-Y_{n-1})$ and the cyclic coefficient $K_{1H}$ or K, and multiplies the two. That is, in the case the vertical OB line signal $X_n$ is the first vertical OB line signal in a frame, $(X_n-Y_{n-1})$ is multiplied by the cyclic coefficient $K_{1H}$ and $K_{1H}(X_n-Y_{n-1})$ is obtained, and in the case the vertical OB line signal $X_n$ is the vertical OB line signal of a second or later line, $(X_n-Y_{n-1})$ is multiplied by the cyclic coefficient K and $K(X_n-Y_{n-1})$ is obtained. Then, the multiplication result is output to the subtractor 112.

The subtractor 112 receives input of the vertical OB line signal $X_n$ from the OB line selector 105, and $K_{1H}(X_n-Y_{n-1})$ or $K(X_n-Y_{n-1})$ from the multiplier 111, subtracts $K_{1H}(X_n-Y_{n-1})$ or $K(X_n-Y_{n-1})$ from the vertical OB line signal $X_n$, and outputs the result to the subtractor 113 and the line memory 106 as a vertical OB line signal $Y_n$ to be rewritten to the line memory.

The cyclic operation is repeated thereafter.

That is, with the cyclic operation described above, in the case the vertical OB line signal $X_n$ is the first vertical OB line signal in a frame, the following Equation (1) is obtained as the vertical OB line signal $Y_n$ to be rewritten to the line memory, and in the case the vertical OB line signal $X_n$ is the vertical OB line signal of a second or later line, the following Equation (2) is obtained as the vertical OB line signal $Y_n$.

[Expression 1]

$$Y_n = X_n - K_{1H} \cdot (X_n - Y_{n-1}) = (1 - K_{1H}) \cdot X_n + K_{1H} \cdot Y_{n-1} \quad \text{Equation (1)}$$

[Expression 2]

$$Y_n = X_n - K \cdot (X_n - Y_{n-1}) = (1 - K) \cdot X_n + K \cdot Y_{n-1} \quad \text{Equation (2)}$$

A signal $Q_n$ quantized by the AD converter 103 and the vertical OB line signal $Y_n$ expressed by Equation (1) or (2) mentioned above from the subtractor 112 are input to the subtractor 113. The subtractor 113 performs a vertical line correction operation by taking the vertical OB line signal $Y_n$ expressed by Equation (1) or (2) mentioned above as a vertical line correction signal and subtracting the same from the quantized signal $Q_n$.

Figure 2:
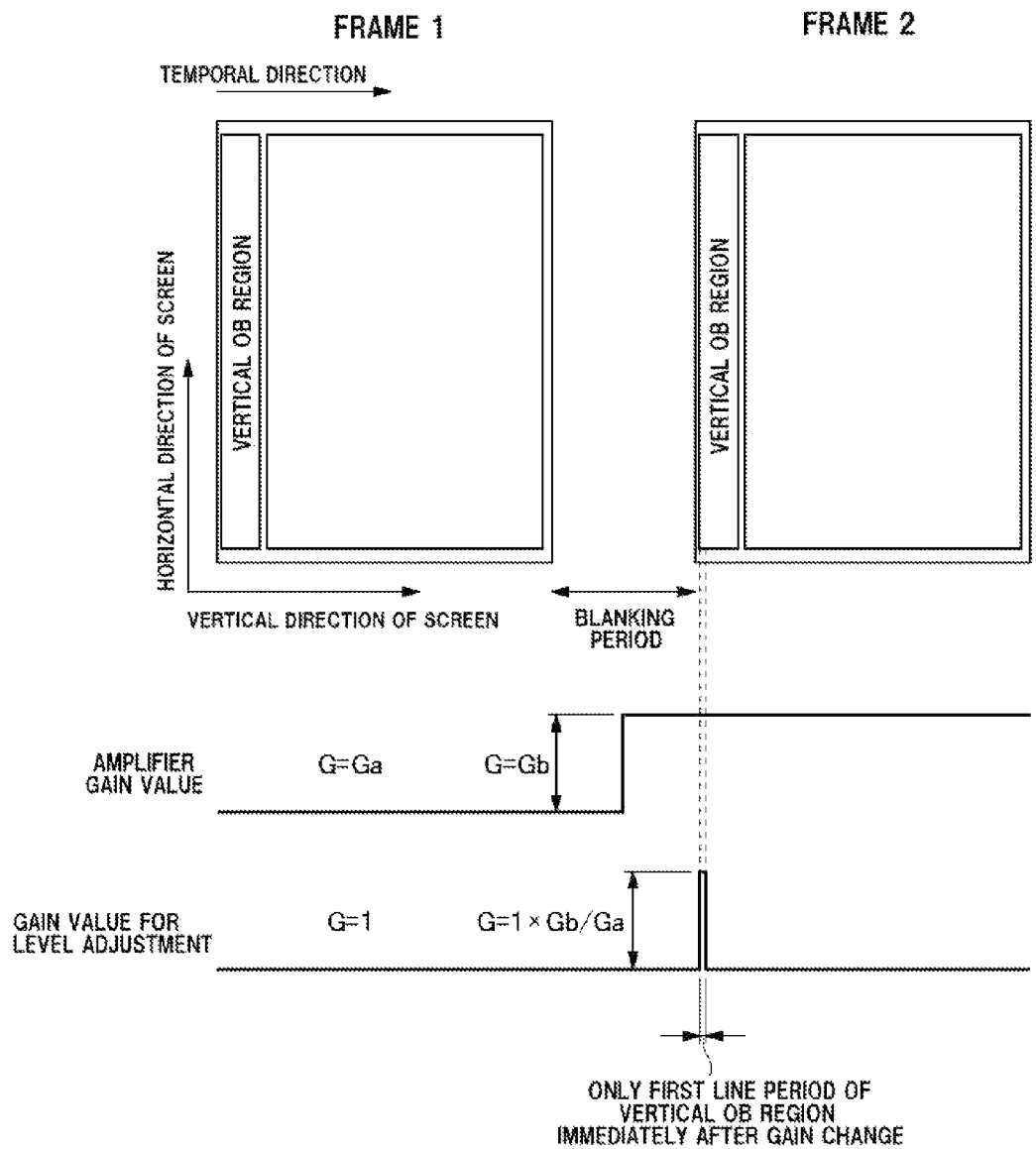
FIG. 2 is an explanatory diagram of gain adjustment by the imaging device according to the embodiment.

FIG. 2 is a diagram for describing gain adjustment performed by the level adjuster 107 according to the present embodiment.

It is assumed that the gain of the amplifier 102 changes from Ga to Gb in a blanking period between a frame 1 and a frame 2. In this case, the video signal level of the frame 2 is Gb/Ga times with respect to the video signal level of the frame 1.

Then, a vertical OB line signal of a past frame read out from the line memory 106 in the first line of vertical OB lines is multiplied by a gain value for level adjustment Gb/Ga, and the level is adjusted to be near the level of a current vertical OB line signal. Then, the cyclic operation of (Equation 1) is performed on the vertical OB line signal which has been adjusted, and the signal is written again to the line memory 106 as an adjusted signal $Y_n$.

The gain of the amplifier 102 is not changed for the same frame for the second or later line of the vertical OB lines, and signal adjustment is not necessary. Accordingly, the gain value for level adjustment is returned to one for the second or later line of the vertical OB lines.

By the operation described above, the level of the signal $Y_n$ stored in the line memory 106 and the level of the vertical OB line signal will be approximately similar for the frame 1 and the frame 2 regardless of the gain, and the vertical line correction described above is enabled.

Figure 3:
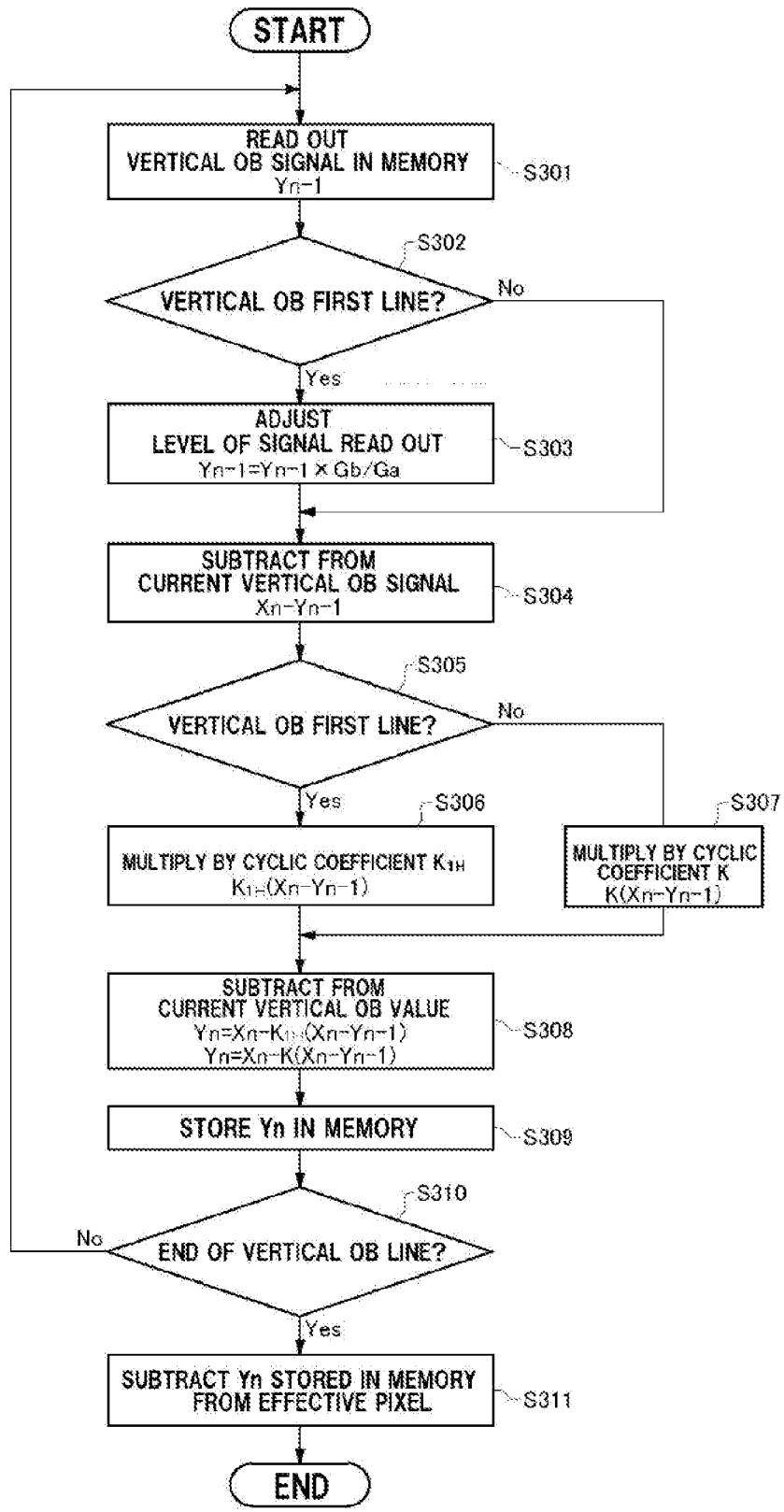
FIG. 3 is a flow chart of signal processing according to the embodiment.
Figure 4:
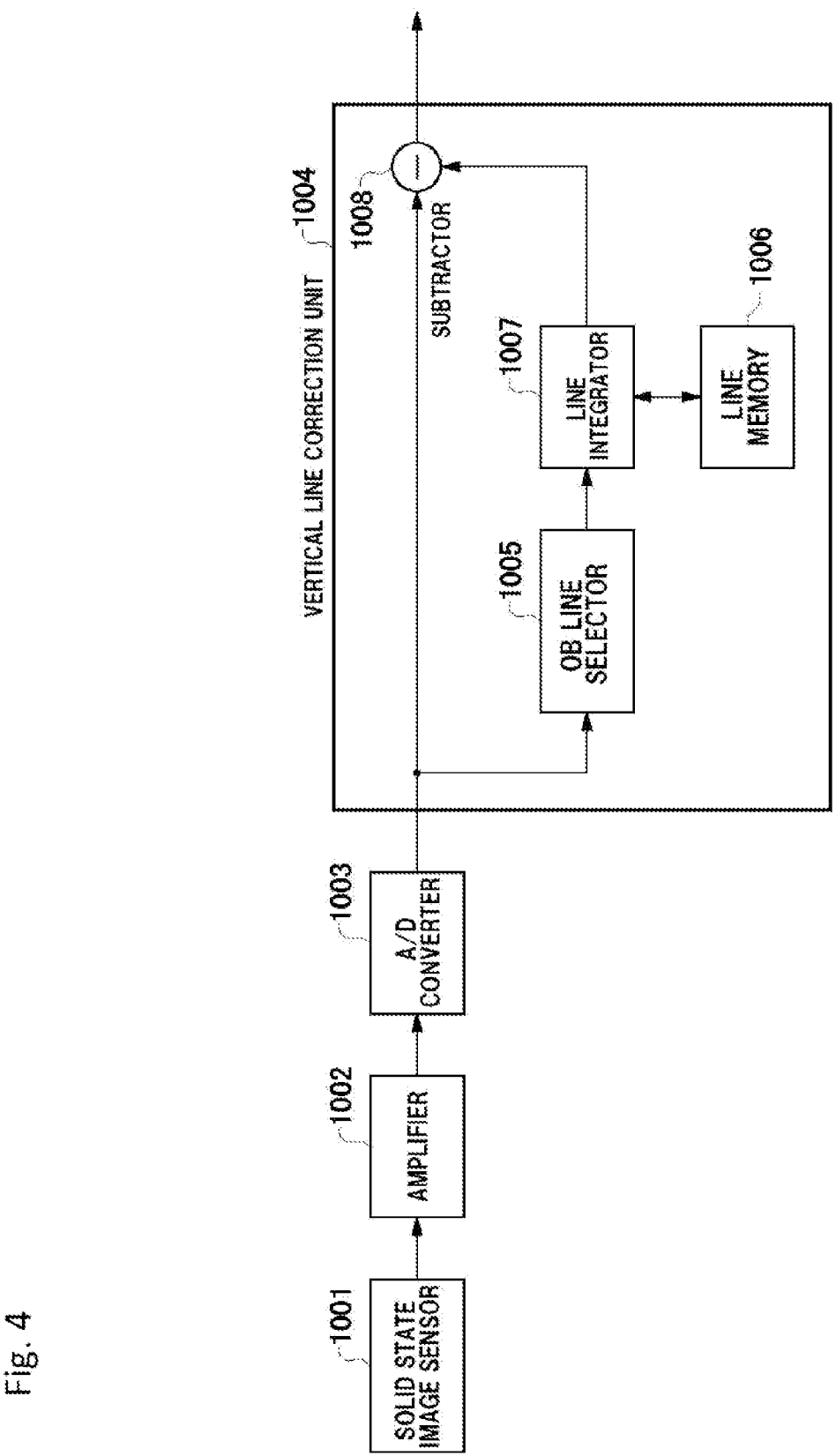
FIG. 4 is a block diagram showing an overview of an example configuration of a conventional imaging device at the time of performing correction for removal of vertical line noise using a vertical OB region which is an optically black region.

FIG. 3 is a flow chart of signal processing according to the present embodiment, and each step described below forms an imaging method of the present invention.

First, to generate a vertical line correction signal, a vertical OB line signal $Y_{n-1}$ stored in the line memory 106 in a past frame is read out (S301). Next, whether a quantized signal input from the solid state image sensor 101 via the amplifier 102 and the AD converter 103 is of the first line of vertical OB or not is determined (S302).

If the signal is of the first line of vertical OB (S302: Yes), level adjustment for the signal $Y_{n-1}$ read out in S301 is performed. Specifically, replacement by $[Y_{n-1} \times Gb/Ga]$ as the new $Y_{n-1}$ is performed (S303). Additionally, in the case the quantized signal mentioned above is not of the first line of vertical OB (S302: No), it is of the second or later line of the vertical OB, and the $Y_{n-1}$ is left unchanged.

Next, the $Y_{n-1}$ is subtracted from a signal $X_n$ of the current vertical OB line (S304).

Furthermore, whether the current signal is of the first line of the vertical OB or not is determined (S305), and if the signal is of the first line of the vertical OB (S305: Yes), multiplication by the cyclic coefficient $K_{1H}$ is performed, and $K_{1H} \cdot (X_n - Y_{n-1})$ is calculated (S306).

On the other hand, if the signal is of the second or later line of the vertical OB (S305: No), multiplication by the cyclic coefficient K is performed, and $K \cdot (X_n - Y_{n-1})$ is calculated (S307).

Then, the $Y_n$ given by Equation 1 or 2 mentioned above is calculated using the value obtained in S306 or S307 (S308), and this is stored in the line memory 106 again (S309).

Whether or not the vertical OB lines are over is determined (S310), and if they are not over (S310: No), the steps are repeated from S301. On the other hand, in the case the vertical OB lines are over (S310: Yes), the signal stored in the line memory 106 is read out as the vertical line correction signal and is subtracted from an effective pixel to thereby perform vertical line correction (S311).

In this manner, by causing the level of a vertical line correction signal to follow the video level change, vertical line correction with small correction residue is performed.

In the process described above, grasping of whether a current signal is of the first line or the second or later line in the vertical OB region or whether it is of an effective pixel region may be performed using an interrupt process, for example.

Additionally, in the embodiment described above, the change in the gain is described as the change in the amplification factor of the amplifier before AD conversion, but the gain may also be changed by performing multiplication on a quantized signal after AD conversion. Such a mode after change is also included within the scope of the present invention. Also, with respect to gain adjustment for the first line of vertical OB, multiplication by Gb/Ga is not restrictive, and adjustment by addition of another factor separately determined is also possible. Also, an operation of adjusting the level by reading out a signal stored in the line memory 106 as the vertical line correction signal, subtracting the same from an effective pixel, and then adding or subtracting a certain value, or an operation of adjusting the level by adding or subtracting a certain value to or from a signal read out from the line memory 106 and then subtracting the same by the subtractor 113 is easily conceivable.

Heretofore, the imaging device and the imaging method of the present invention have been described using an embodiment, but it is apparent that each step forming the imaging method described above may be executed according to a program recording the step and by using a computer.

INDUSTRIAL APPLICABILITY

According to the present invention, by causing the level of a vertical line correction signal to follow the video level change such as a change in the amplification factor, vertical line correction may be performed while reducing the correction residue.

REFERENCE SIGNS LIST 101, 1001 Solid state image sensor
102, 1002 Amplifier
103, 1003 AD converter

104, 1004 Vertical line correction unit
105, 1005 OB line selector
106, 1006 Line memory
107 Level adjuster
108 Selector A
109, 112, 113, 1008 Subtractor
110 Selector B
111 Multiplier
1007 Line integrator

The invention claimed is:

1. An imaging device comprising:
a solid state image sensor including an optical black region; and
a vertical line correction unit for performing vertical line correction on an output signal of the solid state image sensor,
wherein the vertical line correction unit includes an OB line selector for selecting an optical black line signal included in output signals of the solid state image sensor,
a memory for storing the optical black line signal,
a level adjuster for adjusting a level of an optical black line signal of a past frame read out from the memory, according to a video gain of the output signal of the solid state image sensor,
a first subtractor for calculating a difference signal between a first optical black line signal of a current frame and the optical black line signal of the past frame whose level has been adjusted,
a multiplier for calculating a product by multiplying the difference signal by a cyclic coefficient,
a second subtractor for obtaining a signal which is the optical black line signal of the current frame from which the product of the difference signal and the cyclic coefficient has been subtracted, and rewriting the signal after subtraction to the memory as an optical black line signal, and
a third subtractor for subtracting a signal read out from the memory from an output signal from an effective pixel region of the solid state image sensor.

2. An imaging method of performing vertical line correction on an output signal of a solid state image sensor including an optical black region, the method comprising:
a step of selecting an optical black line signal included in output signals of the solid state image sensor;
a step of storing the optical black line signal in a memory;
a step of reading an optical black line signal of a past frame from the memory, and adjusting a level according to a video gain of the output signal of the solid state image sensor;
a first subtracting step of calculating a difference signal between a first optical black line signal of a current frame and the optical black line signal of the past frame whose level has been adjusted;
a step of calculating a product by multiplying the difference signal by a cyclic coefficient;
a second subtracting step of obtaining a signal which is the optical black line signal of the current frame from which the product of the difference signal and the cyclic coefficient has been subtracted, and rewriting the signal after subtraction to the memory as an optical black line signal; and
a third subtracting step of subtracting a signal read out from the memory from an output signal from an effective pixel region of the solid state image sensor.

* * * * *